US006976039B2

(12) United States Patent
Chefalas et al.

(10) Patent No.: US 6,976,039 B2
(45) Date of Patent: Dec. 13, 2005

(54) METHOD AND SYSTEM FOR PROCESSING BACKUP DATA ASSOCIATED WITH APPLICATION, QUERYING METADATA FILES DESCRIBING FILES ACCESSED BY THE APPLICATION

(75) Inventors: Thomas E. Chefalas, Somers, NY (US); Steven J. Mastrianni, Unionville, CT (US)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 09/866,251

(22) Filed: May 25, 2001

(65) Prior Publication Data

US 2002/0178173 A1 Nov. 28, 2002

(51) Int. Cl.⁷ ............................................. G06F 17/30
(52) U.S. Cl. .................. 707/204; 707/1; 707/102; 711/161
(58) Field of Search ................. 707/1–10, 200–205, 707/106, 100–102, 103; 711/160–168, 150–159; 713/200–202; 709/203–219; 714/13

(56) References Cited

U.S. PATENT DOCUMENTS

| 5,093,779 A | 3/1992 | Sakurai | 395/600 |
| 5,412,808 A | 5/1995 | Bauer | 395/600 |
| 5,423,022 A | 6/1995 | Ackley | 395/500 |
| 5,504,852 A | 4/1996 | Thompson-Rohrlich | 395/159 |
| 5,617,568 A | 4/1997 | Ault et al. | 395/612 |
| 5,649,205 A * | 7/1997 | Martins | 707/3 |
| 5,701,451 A | 12/1997 | Rogers et al. | 395/600 |
| 5,710,918 A | 1/1998 | Lagarde et al. | 395/610 |
| 5,721,908 A | 2/1998 | Lagarde et al. | 395/610 |
| 5,729,735 A * | 3/1998 | Meyering | 707/10 |
| 5,745,754 A | 4/1998 | Lagarde et al. | 395/615 |
| 5,758,153 A | 5/1998 | Atsatt et al. | 395/614 |
| 5,758,352 A | 5/1998 | Reynolds et al. | 707/200 |
| 5,819,251 A | 10/1998 | Kremer et al. | 707/1 |
| 5,822,780 A | 10/1998 | Schutzman | 711/165 |
| 5,852,747 A | 12/1998 | Bennett et al. | 395/860 |
| 5,873,085 A | 2/1999 | Enoki et al. | 707/10 |
| 5,897,640 A | 4/1999 | Veghte et al. | 707/202 |
| 5,948,062 A | 9/1999 | Tzelnic et al. | 709/219 |
| 5,991,772 A * | 11/1999 | Doherty et al. | 707/202 |
| 6,088,694 A * | 7/2000 | Burns et al. | 707/8 |
| 6,145,044 A | 11/2000 | Ogura | 710/126 |
| 6,185,574 B1 | 2/2001 | Howard et al. | 707/200 |

(Continued)

FOREIGN PATENT DOCUMENTS

EP 0566964 B1 * 8/1997 ............ 11/14

(Continued)

OTHER PUBLICATIONS

EMC Data Manager, EDM Symmetrix connect, A description of EDM Symmetrix Connect Backup published on Nov. 1998, pp. 1–9.*

(Continued)

Primary Examiner—Srirama Channavajjala
(74) Attorney, Agent, or Firm—Duke W. Yee; Louis P. Herzberg; Francis Lammes (57) ABSTRACT

A method, apparatus, and computer implemented instructions for backing up data in a data processing system. In response to a request to backup data associated with an application, a data store is queried containing meta data regarding files associated with the application in which the data store includes meta data describing the files accessed by the application. A result is received in response to querying the data store, and contains information about files that need to be backed up. The information is then used to drive the backup program. The files are then subsequently backed up to a storage system.

61 Claims, 5 Drawing Sheets

U.S. PATENT DOCUMENTS

| | | | |
|---|---|---|---|
| 6,195,650 B1 | 2/2001 | Gaither et al. ................. 707/1 |
| 6,230,185 B1 | 5/2001 | Salas et al. ................. 707/204 |
| 6,266,679 B1 * | 7/2001 | Szalwinski et al. ......... 707/204 |
| 6,279,011 B1 * | 8/2001 | Muhlestein ................. 707/204 |
| 6,321,219 B1 | 11/2001 | Gainer et al. ................. 707/3 |
| 6,327,703 B1 | 12/2001 | O'Donnell et al. ............ 717/5 |
| 6,330,570 B1 * | 12/2001 | Crighton .................... 707/204 |
| 6,341,341 B1 * | 1/2002 | Grummon et al. .......... 711/162 |
| 6,351,741 B1 | 2/2002 | Flenniken ..................... 707/2 |
| 6,356,915 B1 | 3/2002 | Chtchetkine et al. ....... 707/200 |
| 6,381,615 B2 | 4/2002 | Gaither et al. .............. 707/200 |
| 6,453,325 B1 * | 9/2002 | Cabrera et al. ............. 707/204 |
| 6,453,354 B1 | 9/2002 | Jiang et al. .................. 709/229 |
| 6,513,051 B1 * | 1/2003 | Bolosky et al. ............. 707/204 |
| 6,639,615 B1 | 10/2003 | Majumdar et al. .......... 345/839 |
| 6,654,769 B2 | 11/2003 | Ito et al. ..................... 707/200 |
| 6,662,198 B2 | 12/2003 | Satyanarayanan et al. .. 707/204 |
| 6,665,689 B2 * | 12/2003 | Muhlestein ................. 707/204 |
| 6,697,846 B1 | 2/2004 | Soltis ......................... 709/217 |
| 6,704,736 B1 | 3/2004 | Rys et al. .................... 707/100 |
| 6,714,952 B2 * | 3/2004 | Dunham et al. ............. 707/204 |
| 6,732,124 B1 | 5/2004 | Koseki et al. .............. 707/202 |
| 6,742,035 B1 | 5/2004 | Zayas et al. ................. 709/226 |
| 6,766,352 B1 | 7/2004 | McBrearty et al. ......... 709/203 |
| 6,772,177 B2 | 8/2004 | Hsiao et al. ................. 707/204 |
| 6,789,115 B1 | 9/2004 | Singer et al. ............... 709/224 |
| 6,804,680 B2 | 10/2004 | Melli .......................... 707/102 |
| 2001/0025311 A1 | 9/2001 | Arai et al. ................... 709/225 |
| 2002/0103818 A1 | 8/2002 | Amberden ................. 707/205 |
| 2002/0111840 A1 | 8/2002 | Bagdonas et al. ............. 705/7 |
| 2002/0120634 A1 | 8/2002 | Min et al. ................... 707/200 |
| 2002/0169781 A1 | 11/2002 | Poole et al. ................ 707/100 |
| 2004/0107199 A1 * | 6/2004 | Dalrymple et al. ......... 707/100 |
| 2004/0193953 A1 * | 9/2004 | Callahan et al. ............... 714/15 |
| 2004/0236916 A1 * | 11/2004 | Berkowitz et al. .......... 711/162 |
| 2005/0021566 A1 * | 1/2005 | Mu ............................. 707/200 |

FOREIGN PATENT DOCUMENTS

| | | | | |
|---|---|---|---|---|
| EP | | 1455276 A1 | 9/2004 | ........... G06F 11/14 |
| EP | | 1484680 A1 * | 12/2004 | ..................... 11/14 |
| WO | WO 00/19337 | * | 4/1999 | ..................... 17/30 |
| WO | WO 99/66401 | * | 12/1999 | ..................... 11/14 |

OTHER PUBLICATIONS

EMC2 White Paper, Backup Solutions for the Celerra File Server, Printed May 15, 2001, pp. 1-8.*

Ann L Chervenak et al. "protecting file systems: A survey of backup techniques", 1998, 15 pages.*

Kim et al., "The Design and Implementation of Tripwire: A File System Integrity Checker", Proceedings of the $2^{nd}$ ACM Conference on Computer and Communications Security, 1994, pp. 1-18.

Christensen et al., "Accessing Remote Filesystems as Autonomous Information Sources", Published Mar. 2000, pp. 1-4.

Lei et al., "An Analytical Approach to File Prefetching", 1997 USENIX Annual Technical Conference, 14 pages.

Mutka et al., "Managing Personal Files Across Independent File Management Units", Distributed Computing Systems, Proceeding Third Workshop on Future Trends, 1992, pp. 254-261.

* cited by examiner

GetFileList (szAppName, char*criteria);
/
600

METHOD AND SYSTEM FOR PROCESSING BACKUP DATA ASSOCIATED WITH APPLICATION, QUERYING METADATA FILES DESCRIBING FILES ACCESSED BY THE APPLICATION

CROSS REFERENCE TO RELATED APPLICATIONS

The present invention is related to Method and Apparatus for the Automatic Migration of Applications and Their Associated Data and Configuration Files, Ser. No. 09/865,249, is now pending and Method and Apparatus for the Automatic Discovery of the Relationships Between Applications and Their Associated Data and Configuration Files, Ser. No. 09/854,243, is now pending.

BACKGROUND OF THE INVENTION

1. Technical Field

The present invention relates generally to an improved data processing system, and in particular to a method and apparatus for managing information about applications and files. Still more particularly, the present invention provides a method, apparatus, and computer implemented instructions for automatically identifying files that need to be backed up using relational meta data. The list of those files is then supplied to a standard backup program using programatic functions supplied by the present invention.

2. Description of Related Art

When an application is installed on a computer system, the setup program, which is part of the application and supplied by the application supplier, registers with the operating system that the application will be creating data files of a certain file type on the file system. More specifically, the setup program tells the operating system the type of data files that will be created, edited, deleted, or otherwise manipulated by the application. Data files manipulated by the application are associated with that application as long as that application remains installed on the computer system and, providing that the file type is not changed. If the application is removed, the mapping of the file extension to the application is lost. The current state of the art is to identify the data file type with a one to three-letter filename extension. For example, the setup program for Microsoft Word registers with the operating system to indicate that filenames with the extension ".doc" are associated with Microsoft Word. Microsoft Word is a word processing program available from Microsoft Corporation. As a result, when a user selects a data file to be opened, the operating system uses the filename extension of that data file to determine which application should be launched.

Users typically install dozens of applications on a data processing system, such as editors, e-mail programs, Internet browsers, and business applications such as payroll or inventory access. Each of these applications usually creates, edits, renames, or deletes data files of a certain data type as determined by the file type extension. These data files may include user identification such as users Ids and passwords, application configuration files, reports, and data files. Currently, each application consistently creates data file types associated with an application vendor determined filename extension. For example, Microsoft Word creates document data files using the filename extension ".doc", Lotus Word-Pro creates document data files using the filename extension ".1wp", and Lotus Notes creates data files using the filename extension ".id" for userid information and ".nsf" for notes databases. Lotus Word Pro and Lotus Notes are available from Lotus Development Corporation. Each application vendor selects a unique filename extension to be used for their application and hopes that no other application vendor selects the same extension. In the case of some programs that use common types of files such as .mid or .jpg, installing another program will often incorrectly associate the data files with the newly installed application.

As the end user executes applications and works on data files, the list of data files associated with the application continually changes. Some data files may be created, others deleted or edited, and some renamed to other filenames or file type extensions. The user also may place some of these files in other places within the file system. With these types of file manipulations, the files may become hard to locate without using a tool to search the hard disk drive for filenames with a well known filename extension for a particular application. The files also may contain extensions that do not follow the recommended file naming convention. For example, the user may create a Microsoft Word document and save it with the filename extension of ".zoo" instead of the standard .doc extension.

When the user needs to backup files from a data processing system for a particular application, locating these files becomes nearly impossible. In particular, it is difficult to locate all the data files created and required by an application. The files may not be in the same place that they were originally created, and may not have the same filename or filename extension that is indirectly associated with the application. In addition, the application may create data files, such as application settings, that are not registered with the operating systems associations to applications.

For example, Lotus Notes creates a desktop.dsk file to store the layout of the applications workspace, but the file extension .dsk is not associated with Lotus Notes during the applications installation. If the user attempts to back up the data for this applications, all of the files associated with the application should also be backed up, but there is currently no way to insure that all of the data and configuration files have been located and subsequently backed up.

The user can search for all occurrences of a particular file extension, but this would be a tedious task. Even if the user finds all files with a particular extension, there is no way to be sure that all the files of that type have been located because they may have been renamed or moved to another location, such as a network share.

Existing backup programs do a satisfactory job of locating the data files associated with a particular application, but only if the files have the correct file type extension expected by the backup program. Also, the backup program will generally search only one folder or directory, and expects the data files to always be located in that directory or folder.

Therefore, it would be advantageous to have an improved method, apparatus, and computer implemented instructions for backing up files in which a user is relieved from having to search for data files associated with an application.

SUMMARY OF THE INVENTION

The present invention provides for a method, apparatus, and computer implemented instructions for identifying files to be backed up using relational meta data and backing up the files. In a preferred embodiment the list of those files may be supplied to a standard backup program. In response to a request to backup data associated with an application, a data store is queried containing meta data regarding files associated with the application in which the data store includes meta data describing the files accessed by the application. A result is received in response to querying the data store, and this result is used as input to the backup program. The backup program retrieves a list of files to be backed up or restored using programatic functions supplied by the present invention. The files are backed up to a storage system using a standard backup program.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
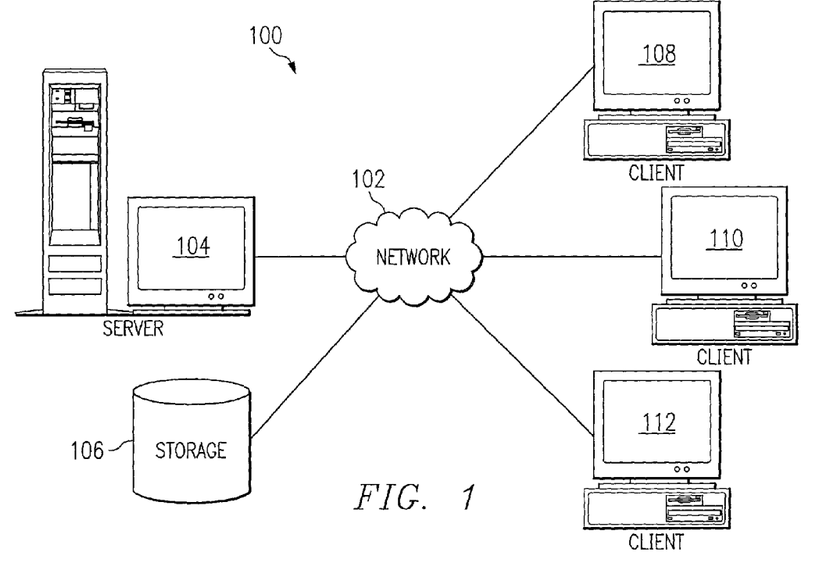
FIG. 1 is a pictorial representation of a network of data processing system in which the present invention may be implemented.

With reference now to the figures, FIG. 1 depicts a pictorial representation of a network of data processing system in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
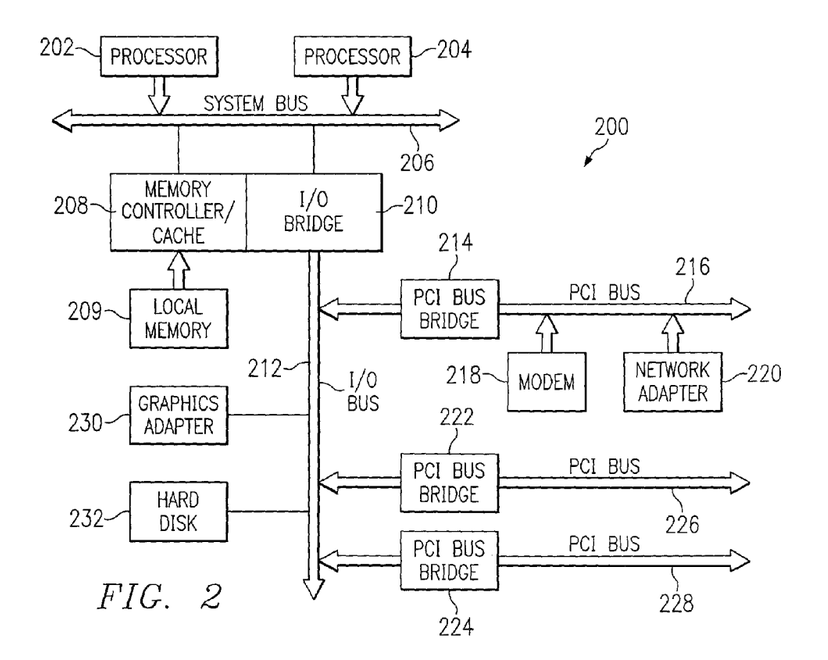
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 maybe provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
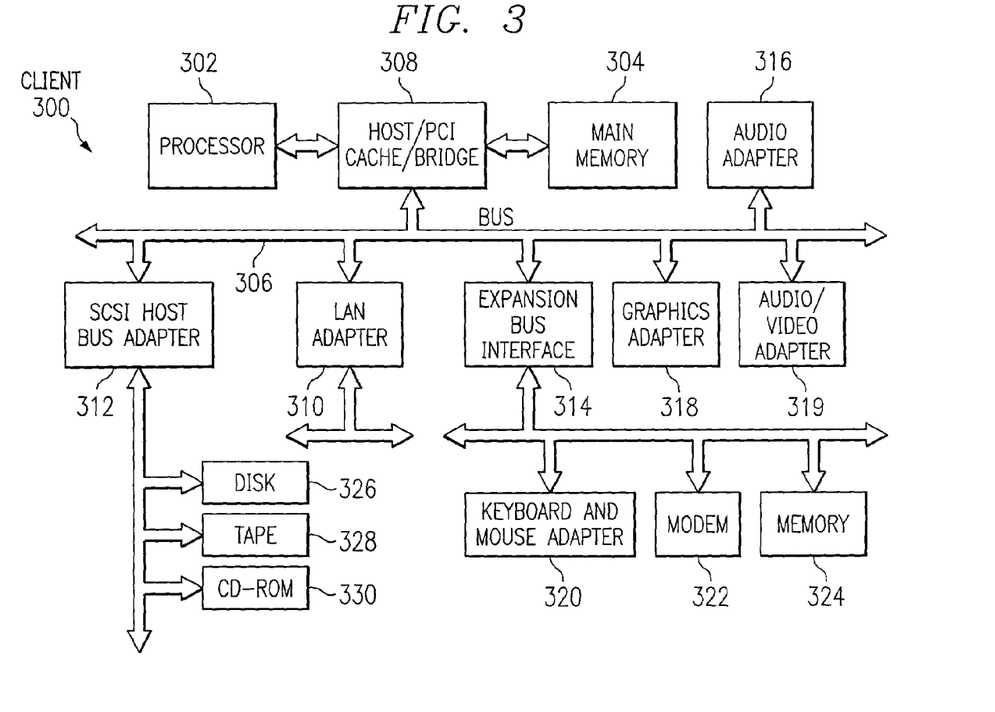
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) maybe used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide nonvolatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
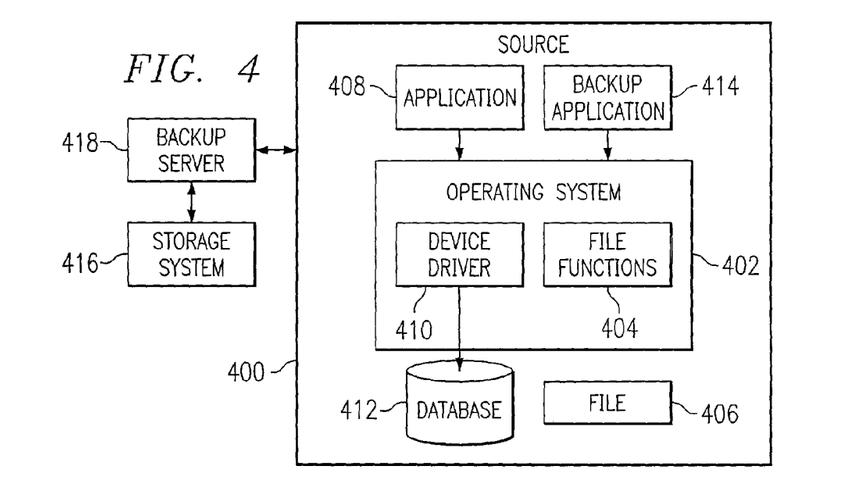
FIG. 4 is a diagram illustrating components involved in backing up applications and associated data in accordance with a preferred embodiment of the present invention.

With reference now to FIG. 4, a diagram illustrating components involved in backing up applications and associated data is depicted in accordance with a preferred embodiment of the present invention. The components illustrated in FIG. 4 may be implemented as software and data structures in data processing systems, such as data processing system 200 in FIG. 2 and data processing system 300 in FIG. 3.

In the depicted examples, source 400 includes operating system 402, which contains file functions 404. These files functions are used to perform different functions on files, such as file 406 in response to requests from applications, such as application 408. These functions include, for example, opening, closing, creating, copying, renaming, and deleting files. When the user starts application 408, application 408 generally requires a data file to act upon. For instance, starting a word processor usually requires that the user indicate the name of the file to be created, edited, or processed. Most applications have some type of open menu where the user specifies which file is to be opened. The user generally clicks a "file open" button or menu item to open a file, and is then presented with a list of files meeting the user's work criteria.

Using current technology, the list of files available to work on is determined by the file type, which may be identified through the file type extension. When an application is installed, it usually notifies the operating system as to which file type extension should be associated with that program. For example, Microsoft Word notifies the operating system that it will use files with the .doc extension. After the application is installed, if the user selects a file with the .doc extension, the Microsoft Word application will be launched to operate on that file. Using current technology, the association between the application program and the file type extension exists until that application program is removed from the system. If the application is removed, the removal program also removes any associations that had been established at the time the application was installed.

With the mechanism of the present invention, calls by the application 408 to file functions 404 are hooked or routed to device driver 410. Although a device driver is illustrated, the present invention may employ a service other than device driver 410 depending on the particular implementation. These functions calls include opening, closing, creating, copying, renaming, and deleting a file. Each time a call for one of the file functions is made, the call is intercepted by device driver 410. The name of the program making the call is identified by device driver 410 along with the name of the data file being operated on.

For example, device driver 410 hooks the single entry point of the "file close" function. Each time a file, such as file 406, is closed, the close is intercepted by device driver 410. Device driver 410 identifies the name of application 408 closing file 406, along with the name of file 406. In this example, file 406 is opened and closed by application 408, representing a normal close of file 406. The relational meta data that represents the association of file 406 to application 408 is updated in database 412 with the new information. If application 408 opens file 406, but another software entity, such as operating system 402 closes file 406, then an abnormal close may have occurred because of a failure in application 408.

Each time a file is opened or closed, the relational meta data for the given file is updated by device driver 410. The mechanism of the present invention also may hook the operating system entry points for file erase, file rename, file move, and file copy functions. These additional hooks also update the relational meta data in database 412. If an application program, in the process of executing, creates a file, the file creation information and association to the application program is stored in relational meta data. If the application program deletes a file, the relational meta data for the deleted file is deleted. The relational meta data for file 406 is updated in database 412 if the application renames file 406. It is important to note that, in these examples, in the event that the same file is accessed by more than one program, the database will contain the reference to the application that accessed the file most recently.

If the user copies file 406 to another location, the relational meta data for file 406 is updated with the new location. If multiple applications perform activity against file 406, the relational meta data for file 406 is updated to reflect the association to multiple applications.

When application 408 is started, the user is presented with a list of files to work on, depending on the file type extension registered with the operating system by application 408. The user selects one or more files to work on, and then confirms the choice by clicking an OK button or similar type of control. Some application programs, such as Microsoft Word, keep a finite length list of the files acted upon in persistent storage. One of the options the user has is to select the history list of files that have been accessed by the application program.

The list of files displayed that can be acted upon is based on the file type extension. However, the user may have renamed the file with a different extension, or moved the file to another area on the disk or even another computer or network share. Application 408 has no direct knowledge of these files, their new extension, or their new location because the file type extension has changed or the files have been moved to an unknown location.

Because this information is stored in database 412, a backup application or scheduler, such as backup application 414, can query database 412 through calls to device driver 410 using programatic function supplied by the present invention to find the file names and location of all of the data and configuration files associated with the application 408. Backup application 414 then uses the list of files from database 412 to present to the user at the time backup application 414 is run. Instead of choosing a data file of a certain file type extension and from a specified physical location on the disk, the user can now select any file that had been created by application 408 and from any location on the disk. In this example, backup application 414 may be any custom-written backup application or any commercially available backup applications such as Tivoli Storage Manager, or Veritas Backup Exec. Tivoli Storage Manager is available from Tivoli Systems, Inc. and Veritas Backup Exec. is available from Veritas Software Corporation. The files are then backed up to storage system 416 in these examples. Storage system 416 may be a local backup device or a remote backup device connected to source 400 by a network, such as network 102 in FIG. 1. Storage system 416 may contain one or more storage devices, such as, for example, a hard disk drive, a tape drive, or a rewriteable compact disk drive.

The access to database 412 may be provide through standard application programming interface (API) calls made to device driver 410 from backup application 414 or another application. If multiple applications perform activities against the same file, the relational meta data stored in database 412 is updated to reflect the association with multiple applications.

Using the access methods provided by the invention the user can query the relational database with such queries as:

Show me the files created between Dec. 1, 2000 and Dec. 15, 2000.

Show me the files created since Jan. 1, 2001 by the user stevemas.

Show me all of the files associated to the Lotus 1-2-3 program.

The association of applications with files and file locations may extend to files created, stored, or moved on remote storage devices located on another computer system. The mechanism of the present invention may be installed as an integral part of operating system 402, such as within a kernel. Alternatively, the mechanism may be added as a patch or add-on component if added to operating system 402 after its installation.

In these examples, the meta data is stored in a data store and takes the form of a database. A data store is some data structure or system used to store meta data. Another data store, which may be used, is a flat file or a table.

When a user or administrator desires to backup data for an application, such as application 408, the user invokes the mechanism of the present invention. The user may select a "backup" function through backup application 414 located on source 400. Alternatively, the backing up of files may be initiated remotely through backup server 418. This backup option presents a menu of the files to be backed up by reading the relational meta data for each file that is related to the relevant application. The user can then accept or refuse for one or more files to be copied or backed up to the new system. Alternatively, the backup through backup server 418 or backup application 414 may be employed to identify files without requiring a user to select files for backup.

The mechanism of the present invention queries the relational meta data in database 412 and builds a list of the files to transfer from source 400 to storage system 416. Backup server 418 or backup application 414 acts as an agent or intermediary to ensure that the data is transferred successfully and completely, and that the data is copied and stored on storage system 416. Files may be transferred from source 400 to management server 418 for temporary storage. When storage system 416 is ready to accept files or has been identified, then the files may be sent from backup server 418 to storage system 416. Alternatively, the files may be transferred directly from source 400 to storage system 416 with backup server 418 monitoring and verifying the transfer of data.

When backup application 414 is used on source 400, the application begins the process of copying the necessary data and configuration files to storage system 416 until all required files have been successfully copied.

Figure 5:
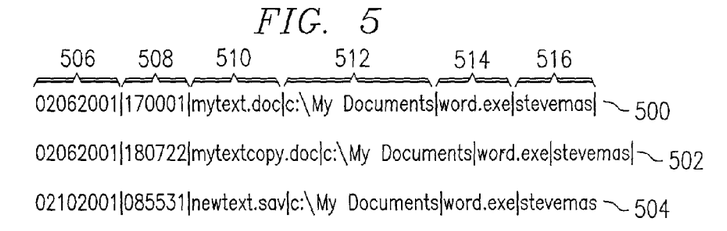
FIG. 5 is a diagram of meta data describing relationships between applications and associated data in accordance with a preferred embodiment of the present invention.

Turning next to FIG. 5, a diagram of meta data describing relationships between applications and associated data is depicted in accordance with a preferred embodiment of the present invention. In the depicted example, records 500, 502, and 504 are examples of meta data, which may be stored in a database, such as database 412 in FIG. 4. Record 500 includes sections 506, 508, 510, 512, 514, and 516. Section 506 identifies the date of the last file update. Section 508 indicates the time the file was last accessed in hours, minutes, and seconds. Section 510 identifies the name of the file, while section 512 identifies the location of the file. The application making the call for the function is identified in section 514. The user is identified in section 516.

Figure 6:
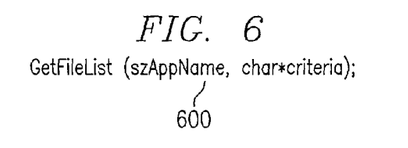
FIG. 6 is a diagram illustrating an example call in accordance with a preferred embodiment of the present invention.

With reference now to FIG. 6, a diagram illustrating an example call is depicted in accordance with a preferred embodiment of the present invention. Call 600 is an example of a call, which may be used to obtain a file list. The call specifies an application name as well as criteria, which may be used to search for records, such as records 500, 502, and 504 in FIG. 5 within database 412 in FIG. 4. The criteria may be, for example, a list of files associated with the Lotus Word Pro application that are more than 30 days old.

Figure 7:
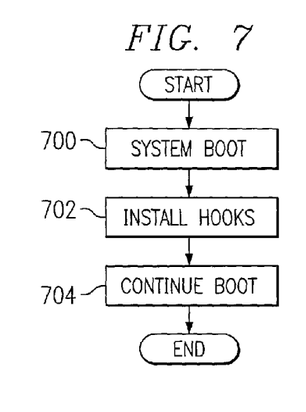
FIG. 7 is a flowchart of a process used for installing the processes for automatically discovering relationships between applications and associated data in accordance with a preferred embodiment of the present invention.

Turning next to FIG. 7, a flowchart of a process used for installing the processes for automatically discovering relationships between applications and associated data is depicted in accordance with a preferred embodiment of the present invention. The process begins by detecting a system boot of the data processing system (step 700). Next, hooks are installed (step 702). The hooks installed are those for use by a device driver to hook or intercept calls for file functions. Then, the system boot is continued (step 704) with the process terminating thereafter.

Figure 8:
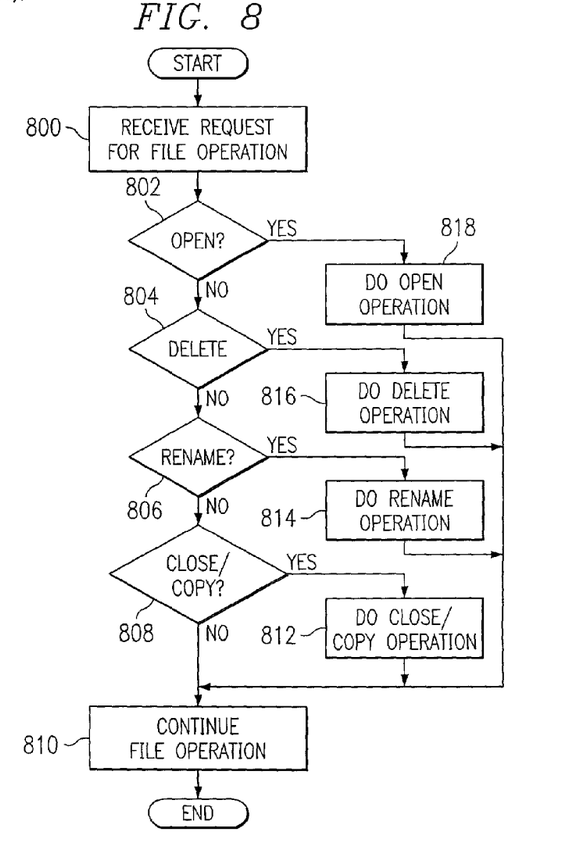
FIG. 8 is a flowchart of a process used for handling requests for file operations in accordance with a preferred embodiment of the present invention.

The flowcharts illustrated in FIGS. 8–12 are examples of processes used to automatically discover relationships between applications and associated data. With reference now to FIG. 8, a flowchart of a process used for handling requests for file operations is depicted in accordance with a preferred embodiment of the present invention. The process illustrated in FIG. 8 may be implemented in a device driver, such as device driver 410 in FIG. 4.

The process begins by receiving a request for a file operation (step 800). Next, a determination is made as to whether the file operation is to open a file (step 802). If the file operation is not open, then a determination is made as to whether the file is to be deleted (step 804). If the file is not to be deleted, a determination is made as to whether the file is to be renamed (step 806).

If the file is not to be renamed, a determination is made as to whether the file is closed or copied (step 808). If the file is not to be closed or copies, file operation continues (step 810) with the process terminating thereafter. At this point, the file operation request is passed to the actual file function that is to process the request.

With reference again to step 808, if the file is to be closed or copied, close or copy operation is performed (step 812) with the process proceeding to step 810. Turning back to step 806, if the file is to be renamed, a rename operation is performed (step 814) with the process proceeding to step 810 thereafter. With reference again to step 804, if the file is to be deleted, a delete operation is performed (step 816) and the process proceeds to step 810 as described above. With reference again to step 802, if the file is opened, an open operation is performed (step 818) with the process proceeding to step 810.

Figure 9:
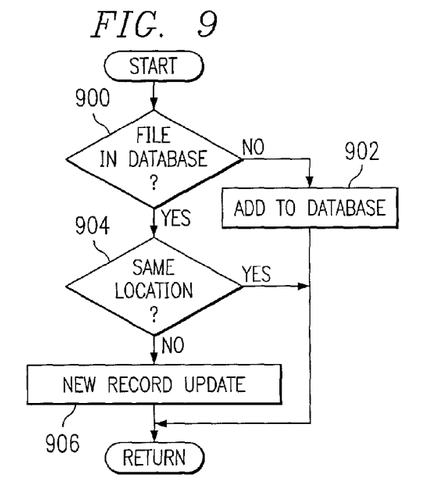
FIG. 9 is a flowchart of a process used for processing an open operation in accordance with a preferred embodiment of the present invention.

Turning next to FIG. 9, a flowchart of a process used for processing an open operation is depicted in accordance with a preferred embodiment of the present invention. The process illustrated in FIG. 9 is a more detailed description of step 818 in FIG. 8.

This process is called in response to an open operation being present. The process begins with a determination as to whether a record of the file identified for the operation is present in the database (step 900). If the file is not present in the database, an identification of the file is added to the database (step 902) with the process returning thereafter for a continuation of the file operation. The identification may include, for example, the name of the file, the name of application requesting the operation, a date, and a time of the request.

Otherwise, a determination is made as to whether the file is found in the same location (step 904). If the file is found at the same location, the process returns to continue processing the file operation. If the file is not in the same location, the record is updated with the new location (step 906) with the process then returning to continue processing of the file operation. The open operation occurs immediately because the database cannot be updated until it is known that the file can be opened.

Figure 10:
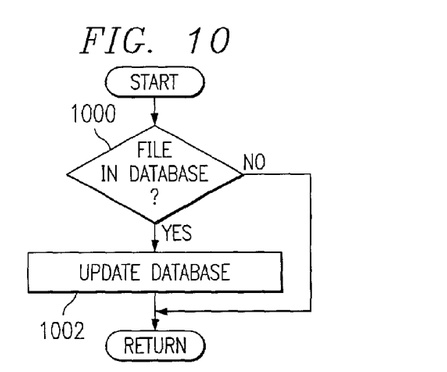
FIG. 10 is a flowchart of a process used for processing a delete operation in accordance with a preferred embodiment of the present invention.

With reference now to FIG. 10, a flowchart of a process used for processing a delete operation is depicted in accordance with a preferred embodiment of the present invention. The process illustrated in FIG. 10 is a more detailed description of step 816 in FIG. 8.

The process begins with a determination as to whether a record of the file is in a database (step 1000). If the file is in the database, the database is updated (step 1002) with the process then returning to continue the file operation. This update reflects the application closing the file as well as other information, such as a time and date of the operation. Otherwise, the process returns without performing any action in the database. In this instance, the file is not tracked by the mechanism of the present invention.

Figure 11:
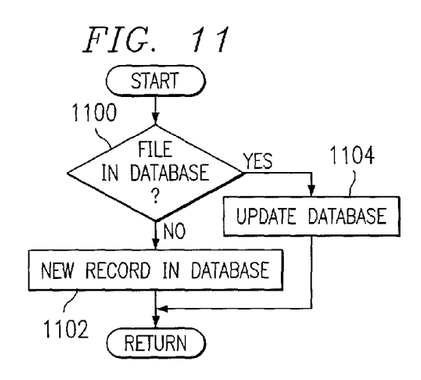
FIG. 11 is a flowchart of a process used for renaming in accordance with a preferred embodiment of the present invention.

Turning next to FIG. 11, a flowchart of a process used for renaming is depicted in accordance with a preferred embodiment of the present invention. The process illustrated in FIG. 11 is a more detailed description of step 814 in FIG. 8.

The process begins with a determination as to whether a record of the file is in the database (step 1100). If the file is not in the database, a new record is established in the database (step 1102), and the process returns to continue processing the file operation. The new record may be in a format, such as, for example, record 500 in FIG. 5. Otherwise, the database is updated (step 1104) with the process returning for continued processing of the file operation.

Figure 12:
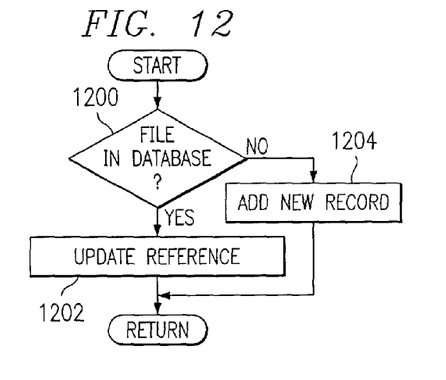
FIG. 12 is a flowchart of a process used for processing a close or copy operation in accordance with a preferred embodiment of the present invention.

With reference now to FIG. 12, a flowchart of a process used for processing a close or copy operation is depicted in accordance with a preferred embodiment of the present invention. The process illustrated in FIG. 12 is a more detailed description of step 812 in FIG. 8.

The process begins with a determination as to whether a record of the file is in a database (step 1200). If the file is in the database, a reference is updated (step 1202) with the process returning to continue the file operation. Otherwise, a new record for the file is added to the database (step 1204), and the process returns for continuation of the file operation.

Figure 13:
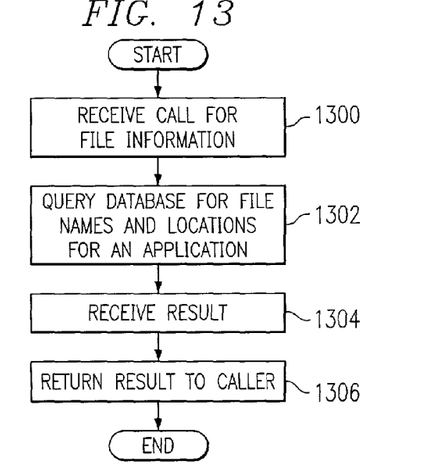
FIG. 13 is a flowchart of a process used for processing queries for file information in accordance with a preferred embodiment of the present invention.

Turning next to FIG. 13, a flowchart of a process used for processing queries for file information is depicted in accordance with a preferred embodiment of the present invention. The process illustrated in FIG. 13 may be implemented in a device driver, such as device driver 410 in FIG. 4.

The process begins by receiving a call for file information (step 1300). This call may be received from an application, such as application 408 in FIG. 4. Next, a database is queried for file names and locations of files for the application identified in the query (step 1302). A result is received from the database (step 1304), and returned to the caller (step 1306) with the process terminating thereafter.

Figure 14:
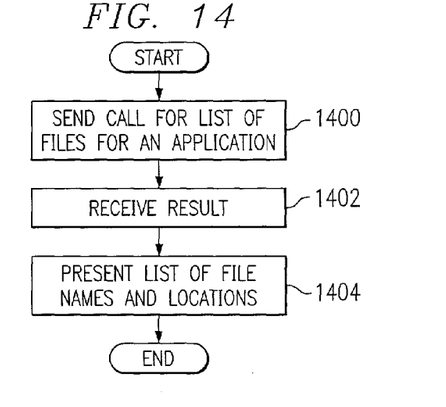
FIG. 14 is a flowchart of a process used by an application to obtain a list of files in accordance with a preferred embodiment of the present invention.

With reference now to FIG. 14, a flowchart of a process used by an application to obtain a list of files is depicted in accordance with a preferred embodiment of the present invention. The process illustrated in FIG. 14 may be implemented in an application, such as application 408 in FIG. 4.

The process begins by sending a call for a list of files for an application (step 1400). This application may be the application generating the call for the list or for another application. This call is sent to a device driver, such as device driver 410 in FIG. 4. Next, a result is received (step 1402). Then, a list of file names and locations is presented to on a display to the user (step 1404) with the process terminating thereafter.

Figure 15:
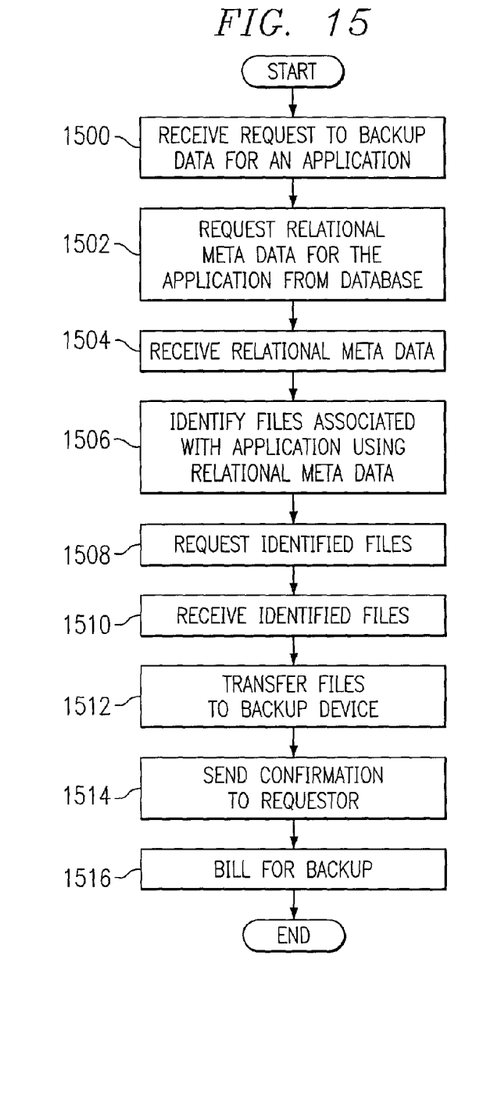
FIG. 15 is a flowchart of a process used for backing up data using relational meta data in accordance with a preferred embodiment of the present invention.

Turning next to FIG. 15, a flowchart of a process used for backing up data using relational meta data is depicted in accordance with a preferred embodiment of the present invention. The process illustrated in FIG. 15 may be implemented in a backup process, such as backup application 414 or backup server 418 in FIG. 4.

The process begins by receiving a request from a requestor to backup data for an application (step 1500). The request may be made by a user or by a process. For example, the process may be a timer or scheduler application, which initiates a backup in response to an event or the passage of some predetermined amount of time. Next, a request is made for relational meta data for the application from a database (step 1502). The relational meta data is received by the requestor (step 1504). Files associated with application are identified using the relational meta data (step 1506). The identified files are requested (step 1508), and then received by the requestor (step 1510). Then, the identified files are transferred to a backup device (step 1512). Next, a confirmation is sent to the requestor (step 1514). The confirmation may be, for example, a message in a popup window or an e-mail message. A user or organization is billed for the backup (step 1516) with the process terminating thereafter. In this case, the billing is performed on a per backup basis. These backup services may be billed using other schemes, such as, for example, billing on a monthly basis for all backups or billing based on the amount of data backed up.

Figure 16:
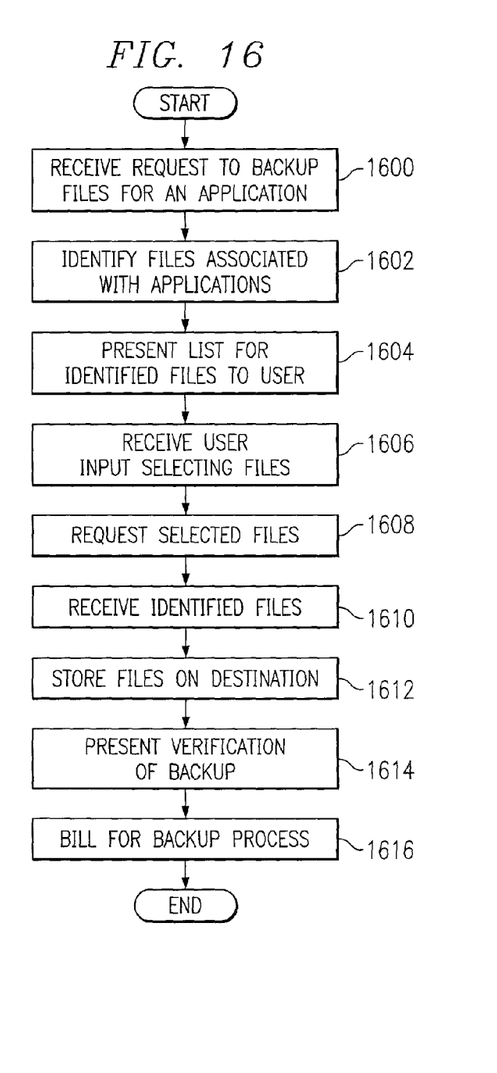
FIG. 16 is a flowchart of a process used for backing up in accordance with a preferred embodiment of the present invention.

With reference now to FIG. 16, a flowchart of a process used for backing up is depicted in accordance with a preferred embodiment of the present invention. The process illustrated in FIG. 16 may be implemented in a backup application, such as backup application 414 or backup server 418 in FIG. 4. In this particular example, user input is received to initiate and select files for to be backed up by a user.

The process begins by receiving a request from a user to backup files for an application (step 1600). The user input may be received through a graphical user interface (GUI). For example, the user may select a "backup" button in the GUI. This request also may be received from another application, such as a timer process or a scheduler program.

Next, files associated with the application are identified (step 1602). A list of identified files is presented to the user (step 1604). The files may be presented in a number of different ways in GUI. For example, a window containing a list of files may be presented on the GUI. A user may select files from the list that are to be backed up, while other files will be ignored. User input selecting the files is then received (step 1606). Requested files are selected (step 1608), and the identified files are received (1610). Then, the identified files are stored on a destination (step 1612). A verification of the backup of the identified files is presented to the user (step 1614). The user is billed for the backup of the files (step 1616) with the process terminating thereafter.

In the example illustrated in FIG. 16, a user may initiate the processes from backup server 418 in FIG. 4 in a remote data processing system or using backup application 414 at data processing system, such as source 400. The files also may be transferred directly from the source to the destination, rather than being stored temporarily by backup server 418 before being sent to storage system 416. Also, these processes may be implemented in storage system 416 without requiring an intermediary, such as backup server 418.

Thus, the present invention provides an improved method, apparatus, and computer implemented instructions for the automatic discovery of files to be backed up to a destination storage system. The identification of files to be backed up is based on meta data collected during the creation and accessing of files by an application on the source data processing system. This data is collected at an operating system level in the depicted examples. When data is to be backed up to a destination storage system, the mechanism of the present invention is invoked to retrieve the meta data. This retrieved meta data is used to identify the files and their locations on the source data processing system. Based on these identifications, the files are copied or moved from the source data processing system to the destination storage system. With the mechanism of the present invention problems associated with changing extensions for files are avoided. Although the mechanism of the present invention has been illustrated with respect to a single application, the process of the present invention may be applied to multiple applications to backup data associated with these applications.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for backing up data, the method comprising:

responsive to a request to backup data associated with an application, querying a data store containing meta data regarding files associated with the application, wherein the data store includes meta data describing the files accessed by the application;

receiving a result in response to querying the data store; and backing up the files identified in the result to a storage system.

2. The method of claim 1, wherein the files are backed up using a standard backup program.

3. The method of claim 1, wherein the data store is one of a database and a text file.

4. The method of claim 1, wherein the data is located on a source data processing system and the storage system is located on a destination data processing system.

5. The method of claim 4, wherein the data processing system is the source data processing system.

6. The method of claim 4, wherein the data processing system is the destination data processing system.

7. The method of claim 1, wherein the queuing step, the receiving step, and the backing up step are performed by a backup process.

8. The method of claim 7, wherein the backup process is located on the data processing system.

9. The method of claim 7, wherein the backup process is located on a data processing system associated with the storage system.

10. The method of claim 1, wherein the storage system includes at least one of a hard disk drive, a tape drive, and a rewriteable compact disk drive.

11. A method in a data processing system for backing up data, the method comprising:

receiving a request to back up data associated with an application;

querying a data store containing data regarding data associated with the application in response to receiving the request, wherein the data store includes meta data describing the files associated with the application;

receiving a result in response to querying the data store; and initiating copying of the files to a backup location.

12. The method of claim 11 further comprising:

supplying the data to a standard backup program.

13. The method of claim 11, wherein the backup location is a storage device located on the data processing system.

14. The method of claim 11, wherein the backup location is at least one of a hard disk, a floppy disk, a magnetic tape, a rewriteable compact disc, and a memory.

15. The method of claim 11, wherein the backup location is a storage system connected to the data processing system through a network.

16. The method of claim 15, wherein the network includes at least one of a local area network, an intranet, the Internet, a wide area network, and a wireless network.

17. A data processing system comprising:

a bus system;

a communications unit connected to the bus system;

a memory connected to the bus system, wherein the memory includes a set of instructions; and a processing unit connected to the bus system, wherein the processing unit executes the set of instructions to query a data store containing meta data regarding files associated with an application in response to a request to backup data associated with the application, wherein the data store includes meta data describing the files accessed by the application; receive a result in response to querying the data store; and backup the files to a storage system.

18. The data processing system of claim 17, wherein the files are backed up using a standard backup program.

19. The data processing system of claim 17, wherein the data store is one of a database and a text file.

20. The data processing system of claim 17, wherein the data is located on a source data processing system and the storage system is located on a destination data processing system.

21. The data processing system of claim 20, wherein the data processing system is the source data processing system.

22. The data processing system of claim 20, wherein the data processing system is the destination data processing system.

23. The data processing system of claim 17, wherein the storage system includes at least one of a hard disk drive, a tape drive, and a rewriteable compact disk drive.

24. A data processing system comprising:

a bus system;

a communications unit connected to the bus system;

a memory connected to the bus system, wherein the memory includes as set of instructions; and a processing unit connected to the bus system, wherein the processing unit executes the set of instructions to receive a request to back up data associated with an application; query a data store containing data regarding data associated with the application in response to receiving the request, wherein the data store includes meta data describing the files associated with the application; receive a result in response to querying the data store; and initiate copying of the files to a backup location.

25. The data processing system of claim 24, wherein the processing unit further executes a set of instructions to supply the data to a standard backup program.

26. The data processing system of claim 24, wherein the backup location is a storage device located on the data processing system.

27. The data processing system of claim 24, wherein the backup location is at least one of a hard disk, a floppy disk, a magnetic tape, a rewriteable compact disc, and a memory.

28. The data processing system of claim 24, wherein the backup location is a storage system connected to the data processing system through a network.

29. The data processing system of claim 28, wherein the network includes at least one of a local area network, an intranet, the Internet, a wide area network, and a wireless network.

30. A data processing system for backing up data, the data processing system comprising:

querying means, responsive to a request to backup data associated with an application, for querying a data store containing meta data regarding files associated with the application, wherein the data store includes meta data describing the files accessed by the application;

receiving means for receiving a result in response to querying the data store; and backing up means for backing up the files identified in the result to a storage system.

31. The data processing system of claim 30, wherein the files are backed up using a standard backup program.

32. The data processing system of claim 30, wherein the data store is one of a database and a text file.

33. The data processing system of claim 30, wherein the data is located on a source data processing system and the storage system is located on a destination data processing system.

34. The data processing system of claim 33, wherein the data processing system is the source data processing system.

35. The data processing system of claim 33, wherein the data processing system is the destination data processing system.

36. The data processing system of claim 30, wherein the queuing means, the receiving means, and the backing means are performed by a backup process.

37. The data processing system of claim 36, wherein the backup process is located on the data processing system.

38. The data processing system of claim 36, wherein the backup process is located on a data processing system associated with the storage system.

39. The data processing system of claim 30, wherein the storage system includes at least one of a hard disk drive, a tape drive, and a rewriteable compact disk drive.

40. A data processing system for backing up data, the data processing system comprising:
    first receiving means for receiving a request to back up data associated with an application;
    querying means for querying a data store containing data regarding data associated with the application in response to receiving the request, wherein the data store includes meta data describing the files associated with the application;
    second receiving means for receiving a result in response to querying the data store; and
    initiating means for initiating copying of the files to a backup location.

41. The data processing system of claim 40 further comprising:
    supplying means for supplying the data to a standard backup program.

42. The data processing system of claim 40, wherein the backup location is a storage device located on the data processing system.

43. The data processing system of claim 40, wherein the backup location is at least one of a hard disk, a floppy disk, a magnetic tape, a rewriteable compact disc, and a memory.

44. The data processing system of claim 40, wherein the backup location is a storage system connected to the data processing system through a network.

45. The data processing system of claim 44, wherein the network includes at least one of a local area network, an intranet, the Internet, a wide area network, and a wireless network.

46. A computer program product in a computer readable medium for backing up data, the computer program product comprising:
    first instructions, responsive to a request to backup data associated with an application, for querying a data store containing meta data regarding files associated with the application, wherein the data store includes meta data describing the files accessed by the application;
    second instructions for receiving a result in response to querying the data store; and
    third instructions for backing up the files identified in the result to a storage system.

47. The computer program product of claim 46, wherein the files are backed up using a standard backup program.

48. The computer program product of claim 46, wherein the data store is one of a database and a text file.

49. The computer program product of claim 46, wherein the data is located on a source data processing system and the storage system is located on a destination data processing system.

50. The computer program product of claim 49, wherein the data processing system is the source data processing system.

51. The computer program product of claim 49, wherein the data processing system is the destination data processing system.

52. The computer program product of claim 46, wherein the first instructions, second instructions, and third instructions are performed by a backup process.

53. The computer program product of claim 52, wherein the backup process is located on the data processing system.

54. The computer program product of claim 52, wherein the backup process is located on a data processing system associated with the storage system.

55. The computer program product of claim 46, wherein the storage system includes at least one of a hard disk drive, a tape drive, and a rewriteable compact disk drive.

56. A computer program product in a computer readable medium for backing up data, the computer program product comprising:
    first instructions for receiving a request to back up data associated with an application;
    second instructions for querying a data store containing data regarding data associated with the application in response to receiving the request, wherein the data store includes meta data describing the files associated with the application;
    third instructions for receiving a result in response to querying the data store; and
    fourth instructions for copying of the files to a backup location.

57. The computer program product of claim 56 further comprising:
    fifth instructions for supplying the data to a standard backup program.

58. The computer program product of claim 56, wherein the backup location is a storage device located on the data processing system.

59. The computer program product of claim 56, wherein the backup location is at least one of a hard disk, a floppy disk, a magnetic tape, a rewriteable compact disc, and a memory.

60. The computer program product of claim 56, wherein the backup location is a storage system connected to the data processing system through a network.

61. The computer program product of claim 60, wherein the network includes at least one of a local area network, an intranet, the Internet, a wide area network, and a wireless network.

* * * * *

UNITED STATES PATENT AND TRADEMARK OFFICE
CERTIFICATE OF CORRECTION

PATENT NO. : 6,976,039 B2  Page 1 of 1
APPLICATION NO. : 09/866251
DATED : December 13, 2005
INVENTOR(S) : Chefalas et al.

It is certified that error appears in the above-identified patent and that said Letters Patent is hereby corrected as shown below:

Col. 1, line 16: after "Ser. No." delete "09/854,243" and insert --09/865,243--.

Signed and Sealed this

Ninth Day of January, 2007

JON W. DUDAS
*Director of the United States Patent and Trademark Office*